United States Patent
Wantland et al.

(10) Patent No.: US 12,486,157 B2
(45) Date of Patent: Dec. 2, 2025

(54) AUTOFILL PITCHER SYSTEM WITH ICE AND WATER FILL

(71) Applicant: Haier US Appliance Solutions, Inc., Wilmington, DE (US)

(72) Inventors: Louis A. Wantland, Louisville, KY (US); Lokesha Kodigenahalli Chinnappa Reddy, Louisville, KY (US); Jeffrey Michael Colyer, Louisville, KY (US); Jordan Andrew Waymeyer, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 18/631,978

(22) Filed: Apr. 10, 2024

(65) Prior Publication Data

US 2025/0320105 A1    Oct. 16, 2025

(51) Int. Cl.
| | | |
|---|---|---|
| *B67D 1/08* | (2006.01) | |
| *B67D 1/00* | (2006.01) | |
| *F25D 23/02* | (2006.01) | |
| *F25D 23/04* | (2006.01) | |
| *F25D 23/12* | (2006.01) | |

(52) U.S. Cl.
CPC ......... *B67D 1/0857* (2013.01); *B67D 1/0006* (2013.01); *F25D 23/028* (2013.01); *F25D 23/04* (2013.01); *F25D 23/126* (2013.01)

(58) Field of Classification Search
CPC ......... F25D 23/126; B67D 7/46; B67D 7/465; B67D 2210/1265; B67D 2210/00036; B67D 2210/1259; B67D 1/124; B67D 1/1238; B67D 1/0894; B67D 1/0003; B65B 43/58; B65B 43/59
See application file for complete search history.

(56) References Cited

U.S. PATENT DOCUMENTS

| | | | |
|---|---|---|---|
| 6,442,954 B1 | 9/2002 | Shapiro et al. | |
| 7,287,555 B2 * | 10/2007 | Heger | F25D 23/126 141/351 |

(Continued)

FOREIGN PATENT DOCUMENTS

| | | | | |
|---|---|---|---|---|
| DE | 102005057152 A1 * | 6/2007 | | A47J 31/4482 |
| KR | 20140047994 A | 4/2014 | | |
| WO | WO2008059939 A1 | 5/2008 | | |

OTHER PUBLICATIONS

GE Appliances, "Refrigerator—Hands-Free Autofill Feature & Operation", accessed https://products.geappliances.com/appliance/gea-support-search-content?contentId=18145 on Apr. 10, 2024, 3 pages.

*Primary Examiner* — Timothy L Maust
(74) *Attorney, Agent, or Firm* — Dority & Manning, P.A.

(57) ABSTRACT

An autofill pitcher system of a refrigerator appliance includes a pitcher and a dispenser. The pitcher defines an internal volume. A cavity of the dispenser is configured to receive the pitcher. The dispenser also includes a fill tube and a chute. Water is provided to the pitcher via the fill tube and ice pieces are provided to the pitcher via the chute. The refrigerator appliance may be operable for, and methods of operating the refrigerator appliance may include filling the pitcher with water via the fill tube, filling the pitcher with ice pieces via the chute, and stopping fill when a level of water and ice within the internal volume of the pitcher reaches a preset level.

20 Claims, 11 Drawing Sheets

(56) References Cited

U.S. PATENT DOCUMENTS

| | | | |
|---|---|---|---|
| 7,743,801 B2 * | 6/2010 | Janardhanam | F25D 23/126 |
| | | | 141/351 |
| 8,935,935 B2 | 1/2015 | Waugh et al. | |
| 9,663,343 B2 * | 5/2017 | Veldhi | B67D 3/0093 |
| 9,890,029 B2 * | 2/2018 | Comsa | B67D 1/1238 |
| 10,233,070 B2 | 3/2019 | Comsa et al. | |
| 10,401,080 B2 | 9/2019 | Root et al. | |
| 10,519,025 B2 * | 12/2019 | Sakthivel | F25D 23/126 |
| 11,215,394 B2 * | 1/2022 | Park | F25D 23/126 |
| 11,629,902 B2 | 4/2023 | Miller et al. | |

\* cited by examiner

AUTOFILL PITCHER SYSTEM WITH ICE AND WATER FILL

FIELD OF THE INVENTION

The present subject matter relates generally to refrigerator appliances, and more particularly to autofill water and ice dispensing systems for refrigerator appliances.

BACKGROUND OF THE INVENTION

Some refrigerator appliances include autofill dispensing systems. Autofill dispensing systems typically include a dispensing housing and a pitcher. When the pitcher is positioned in a designated spot, e.g., beneath the autofill housing, water or another liquid is automatically dispensed into the pitcher. Some autofill dispensing systems include a pitcher present sensor in the dispensing housing and a trigger device in the pitcher to determine when the pitcher is in the correct position to accept the dispensed liquid. In addition to the pitcher present sensor, some autofill dispensing systems include a pitcher full sensor including a float mechanism positioned within a housing of the pitcher that moves upward with the rising liquid in the autofill pitcher. When the liquid within the autofill pitcher has reached a designated fill level, the float mechanism triggers the dispensing system to cease dispensing liquid.

Although the water in the pitcher is generally chilled due to being stored within the refrigerator appliance, some users may desire the water to be colder and/or to stay cold longer. For example, the pitcher may be removed from the refrigerator appliance and used to fill multiple vessels or otherwise provide multiple servings of water (or other liquid), such that later servings may be provided at room temperature or otherwise at a higher temperature than the internal temperature of the refrigerator.

Accordingly, an autofill dispensing system in a refrigerator that addresses one or more of the challenges noted above would be desirable, such as an autofill dispensing system which provides water and ice as well as related methods of operating such systems.

BRIEF DESCRIPTION OF THE INVENTION

Aspects and advantages of the invention will be set forth in part in the following description, may be apparent from the description, or may be learned through practice of the invention.

In one exemplary aspect, a refrigerator appliance is provided. The refrigerator appliance includes a cabinet. The cabinet defines a fresh food chamber. The refrigerator appliance also includes an autofill pitcher system. The autofill pitcher system includes a pitcher and a dispenser. The pitcher includes at least one pitcher wall and an internal volume defined within the at least one pitcher wall. The dispenser defines a cavity. The cavity is configured to receive the pitcher. The dispenser also includes a fill tube and a chute. The fill tube is positioned and configured to direct a flow of water from a water supply into the internal volume of the pitcher when the pitcher is received within the cavity. The chute is positioned and configured to direct one or more ice pieces from an ice supply into the internal volume of the pitcher when the pitcher is received within the cavity. The refrigerator appliance further includes a controller. The controller is configured for filling the pitcher with water to a first level via the fill tube, filling the pitcher with ice pieces to a second level via the chute after filling the pitcher with water to the first level, and filling the pitcher with water to a third level via the fill tube after filling the pitcher with ice pieces to the second level.

In another example aspect, a method of operating a refrigerator appliance is provided. The refrigerator appliance includes a cabinet defining a fresh food chamber and an autofill pitcher system. The autofill pitcher system includes a pitcher and a dispenser defining a cavity. The pitcher includes at least one pitcher wall and an internal volume defined within the at least one pitcher wall. The cavity is configured to receive the pitcher. The dispenser includes a fill tube and a chute. The fill tube is positioned and configured to direct a flow of water from a water supply into the internal volume of the pitcher when the pitcher is received within the cavity. The chute is positioned and configured to direct one or more ice pieces from an ice supply into the internal volume of the pitcher when the pitcher is received within the cavity. The method includes filling the pitcher with water to a first level via the fill tube, filling the pitcher with ice pieces to a second level via the chute after filling the pitcher with water to the first level, and filling the pitcher with water to a third level via the fill tube after filling the pitcher with ice pieces to the second level.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
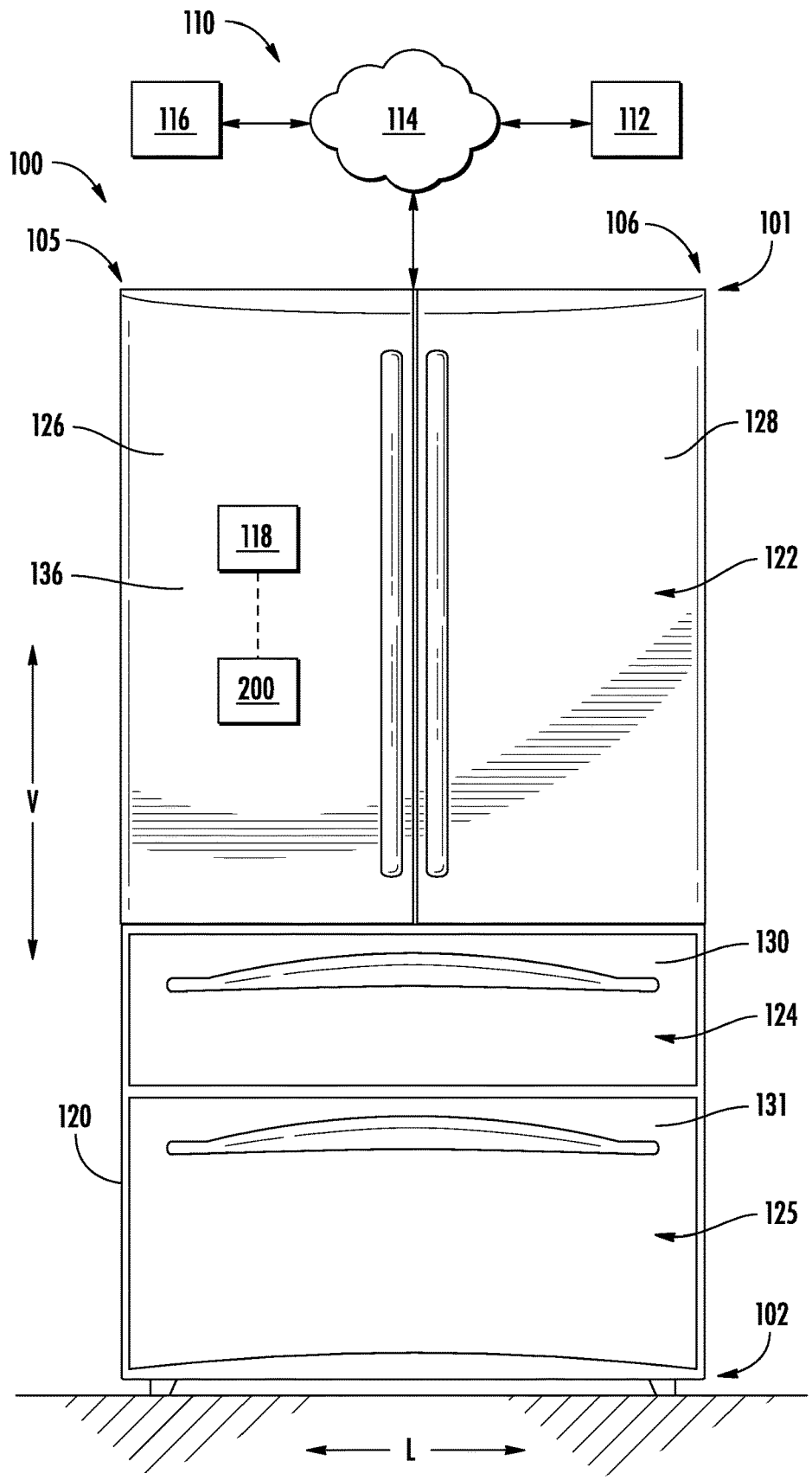
FIG. 1 provides a front view of a refrigerator appliance according to one or more exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Turning to the figures, FIG. 1 provides a front view of an exemplary refrigerator appliance 100 according to one or more exemplary embodiments of the present disclosure. Refrigerator appliance 100 extends between a top 101 and a bottom 102 along a vertical direction V, between a left side 105 and a right side 106 along a lateral direction L, and extends between a front and a back along a transverse direction T (not shown), which is a direction orthogonal to the vertical direction V and the lateral direction L. Vertical direction V, lateral direction L, and transverse direction T are mutually perpendicular and form an orthogonal direction system.

Refrigerator appliance 100 includes a housing or cabinet 120 defining a chilled chamber, fresh food chamber 122, and one or more freezer chambers, such as a first freezer chamber 124 and a second freezer chamber 125, which may both be arranged below fresh food chamber 122 along the vertical direction V. In additional embodiments, the middle chamber may be a flexible chamber in place of first freezer chamber 124 and may be selectively operable at various temperatures for storing any desired food items, such as produce, wine, etc. As illustrated, fresh food chamber 122 is bounded by vertical walls at the left side 105 and at the right side 106, such walls spaced apart in the lateral direction, a horizontal wall at the top 101 and at the bottom by a lower wall 132. In this configuration, refrigerator appliance 100 may generally be referred to as a bottom mount, or bottom freezer, refrigerator. Cabinet 120 also defines a mechanical compartment (not shown) for receipt of a sealed cooling system (not shown).

Left and right refrigerator doors 126, 128, respectively, are rotatably hinged to an edge of cabinet 120 at left 105 and right 106 sides, respectively, for accessing fresh food chamber 122 (FIG. 2) or sealing fresh food chamber 122 as illustrated in FIG. 1. For example, upper and lower hinges may couple each door 126, 128 to cabinet 120. When left and right doors 126, 128 are configured as illustrated in FIG. 1, the door arrangement is sometimes referred to as a "French door" configuration. Freezer doors, such as a first freezer door 130 and a second freezer door 131, may be arranged below refrigerator doors 126, 128 for accessing one or more freezer chambers, such as first and second freezer chambers 124, 125, respectively. In the exemplary embodiment shown in FIG. 1, freezer doors 130, 131 are coupled to freezer drawers (not shown) slidably mounted within first and second freezer chambers 124, 125. Such drawers are thus generally "pull-out" drawers in that they can be manually moved into and out of freezer chambers 124, 125 on suitable slide mechanisms. Each door 126, 128, 130, 131 can include a handle for accessing one of the chambers 122, 124, 125 of refrigerator appliance 100.

Referring still to FIG. 1, a schematic diagram of an external communication system 110 will be described according to an exemplary embodiment of the present subject matter. In general, external communication system 110 is configured for permitting interaction, data transfer, and other communications between appliance 100 and one or more external devices. For example, this communication may be used to provide and receive operating parameters, user instructions or notifications, performance characteristics, user preferences, or any other suitable information for improved performance of appliance 100. In addition, it should be appreciated that external communication system 110 may be used to transfer data or other information to improve performance of one or more external devices or appliances and/or improve user interaction with such devices.

For example, external communication system 110 permits controller 200 of appliance 100 to communicate with a separate device external to appliance 100, referred to generally herein as an external device 112. As described in more detail below, these communications may be facilitated using a wired or wireless connection, such as via a network 114. In general, external device 112 may be any suitable device separate from appliance 100 that is configured to receive communications, information, or data from the controller 200 regarding the operation of refrigerator appliance 100, or provide commands from a user to the controller 200 of the refrigerator appliance 100. In this regard, external device 112 may be, for example, a personal phone, a smartphone, a tablet, a laptop or personal computer, a wearable device, a smart home system, or another mobile or remote device. Controller 200 is in operative communication with external device 112 through network 114 of external communication system 110.

In addition, a remote server 116 may be in communication with appliance 100 and/or external device 112 through network 114. In this regard, for example, remote server 116 may be a cloud-based server 116, and is thus located at a distant location, such as in a separate state, country, etc., from the appliance 100. In additional embodiments, the remote server 116 may be in the fog or the edge instead of the cloud. According to an exemplary embodiment, external device 112 may communicate with a remote server 116 over network 114, such as the Internet, to transmit/receive data or information, provide user inputs, receive user notifications or instructions, interact with or control appliance 100, etc. In addition, external device 112 and remote server 116 may communicate with appliance 100 to communicate similar information.

In general, communication between appliance 100, external device 112, remote server 116, and/or other user devices or appliances may be carried using any type of wired or wireless connection and using any suitable type of communication network, non-limiting examples of which are provided below. For example, external device 112 may be in direct or indirect communication with appliance 100 through any suitable wired or wireless communication connections or interfaces, such as network 114. For example, network 114 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 110 is described herein according to an exemplary embodiment of the present subject matter. However, it should be appreciated that the exemplary functions and configurations of external communication system 110 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

Figure 2:
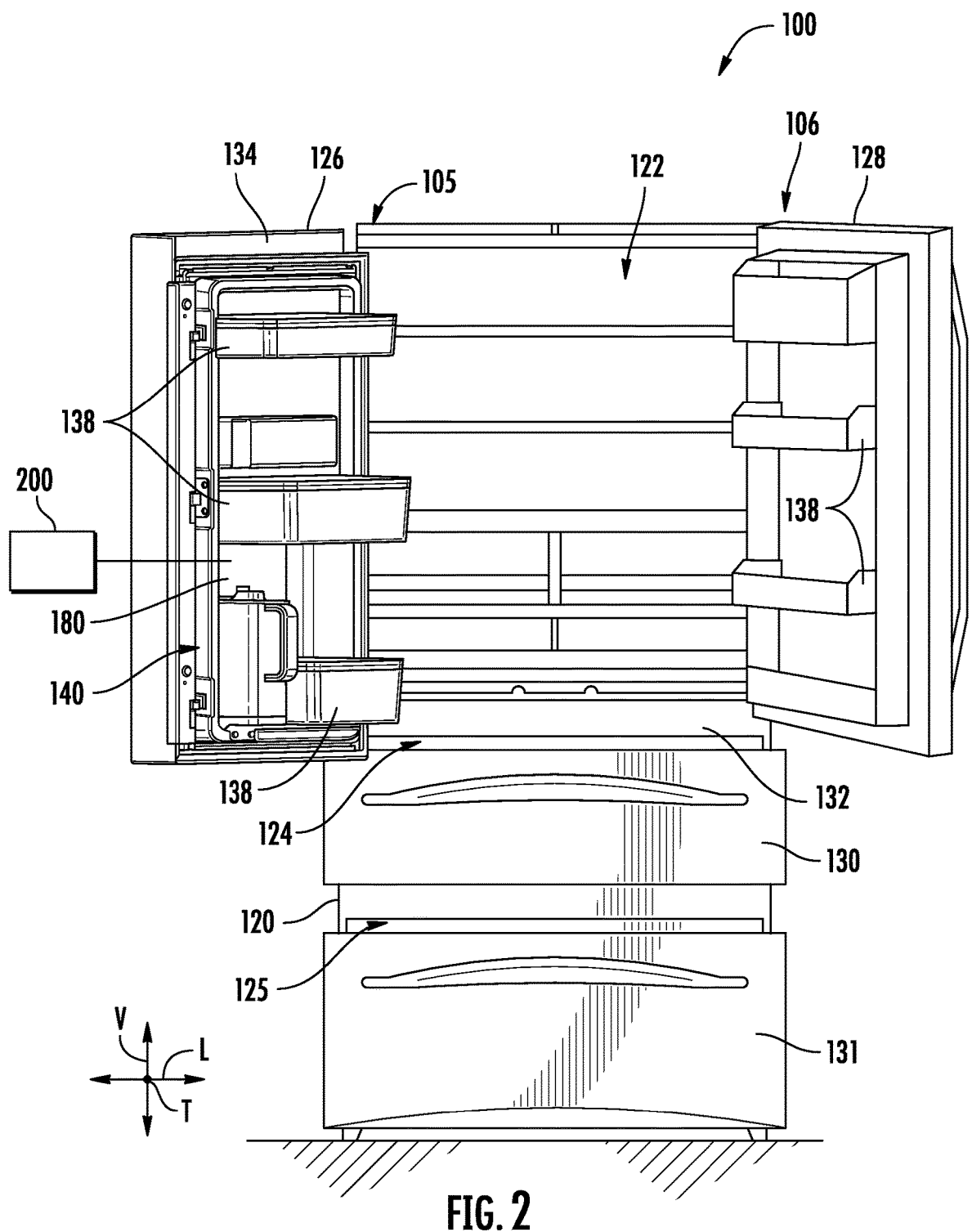
FIG. 2 provides a front view of the refrigerator appliance of FIG. 1 with refrigerator doors shown in an open configuration.

FIG. 2 provides a front perspective view of refrigerator appliance 100 showing refrigerator doors 126, 128 in an open position to reveal the interior of fresh food chamber 122. Additionally, freezer doors 130, 131 are shown in partially open positions to reveal a portion of the interior of freezer chambers 124, 125, respectively.

Left door 126 of refrigerator appliance 100 includes an inner surface 134 and an outer surface 136. Inner surface 134 generally defines a portion of the interior of fresh food chamber 122 when door 126 is in a closed position as shown in FIG. 1. Outer surface 136 is generally opposite inner surface 134 and defines a portion of the exterior of refrigerator appliance 100 when door 126 is in the closed position.

The same construction may result in a similarly formed right door 128 as left door 126, with inner surface 134 and outer surface 136. Moreover, it will further be appreciated that freezer doors 130, 131 can likewise include inner and outer surfaces.

Doors 126, 128 may include storage bins or shelves 138 movably or fixedly attached to the inner surface 134 of the doors 126, 128. In the embodiment illustrated in FIG. 2, left door 126 includes an autofill pitcher system 140 in accordance with this disclosure. The autofill pitcher system 140 is illustrated on the left door 126 for convenience. In other embodiments, the autofill pitcher system 140 may be in a different position on the left door 126, or on the right door 128, or elsewhere within the fresh food chamber 122. The autofill pitcher system 140 comprises a removable pitcher 142, a dispenser 180, and controller 200.

Figure 3:
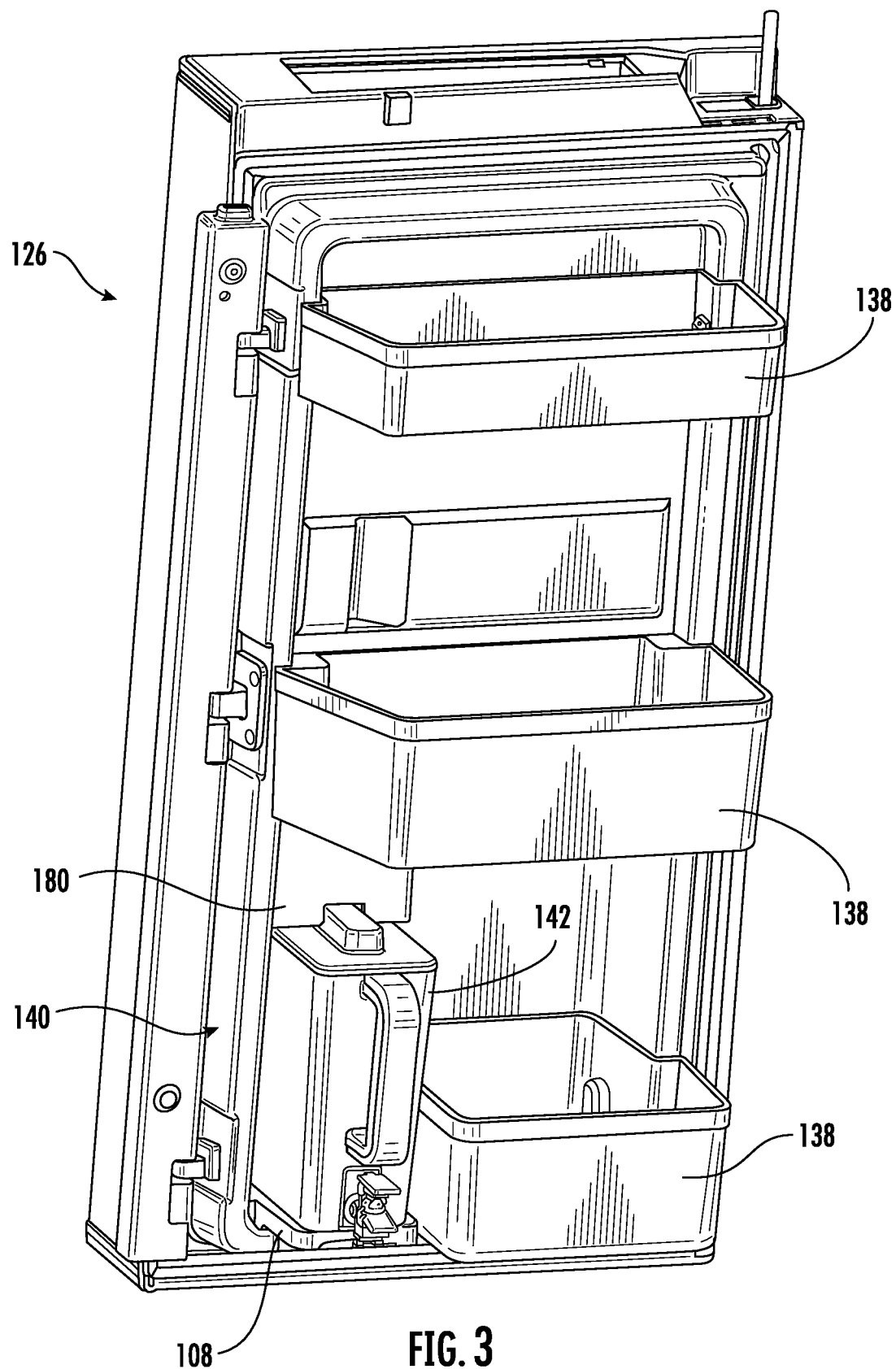
FIG. 3 provides a perspective view of an exemplary door of a refrigerator appliance according to one or more exemplary embodiments of the present disclosure.
Figure 4:
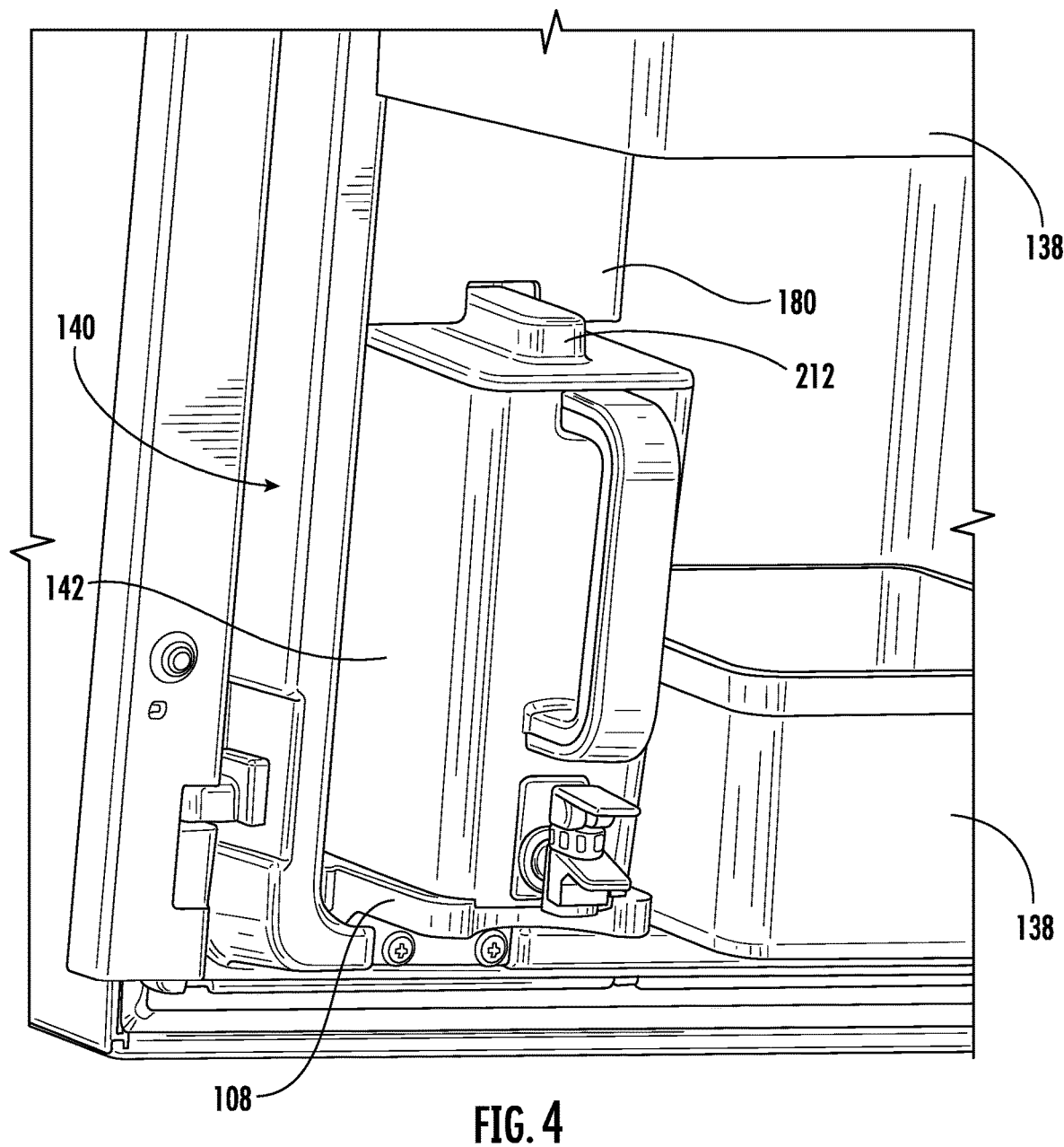
FIG. 4 provides an enlarged perspective view of a portion of the door of FIG. 3.

FIG. 3 provides a perspective view of exemplary door 126 of refrigerator appliance 100 according to one or more exemplary embodiments of the present disclosure, and FIG. 4 provides an enlarged view of a lower portion of the exemplary door 126 of FIG. 3. In the illustrated exemplary embodiments, the autofill pitcher system 140 is provided on the left door 126. As noted above, such is by way of example only and the autofill pitcher system 140 may be provided on right door 128 or elsewhere within the fresh food chamber 122 in various embodiments. As may be seen in FIGS. 3 and 4, the pitcher 142 of the autofill pitcher system 140 may be accessible when the door, e.g., left door 126, is in an open position. The autofill pitcher system 140 comprises a removable pitcher 142, a dispenser 180, and controller 200 (FIGS. 1 and 2). The pitcher 142 may be supported within a cavity 181 (FIG. 7) below a portion of the dispenser 180 and on top of a support shelf 108.

It will be appreciated that the present subject matter can be used with other types of refrigerator appliances as well, such as e.g., top mount, or top freezer, refrigerator appliances or single door refrigerators. Consequently, the description set forth herein is not intended to limit the present subject matter in any aspect.

Figure 5:
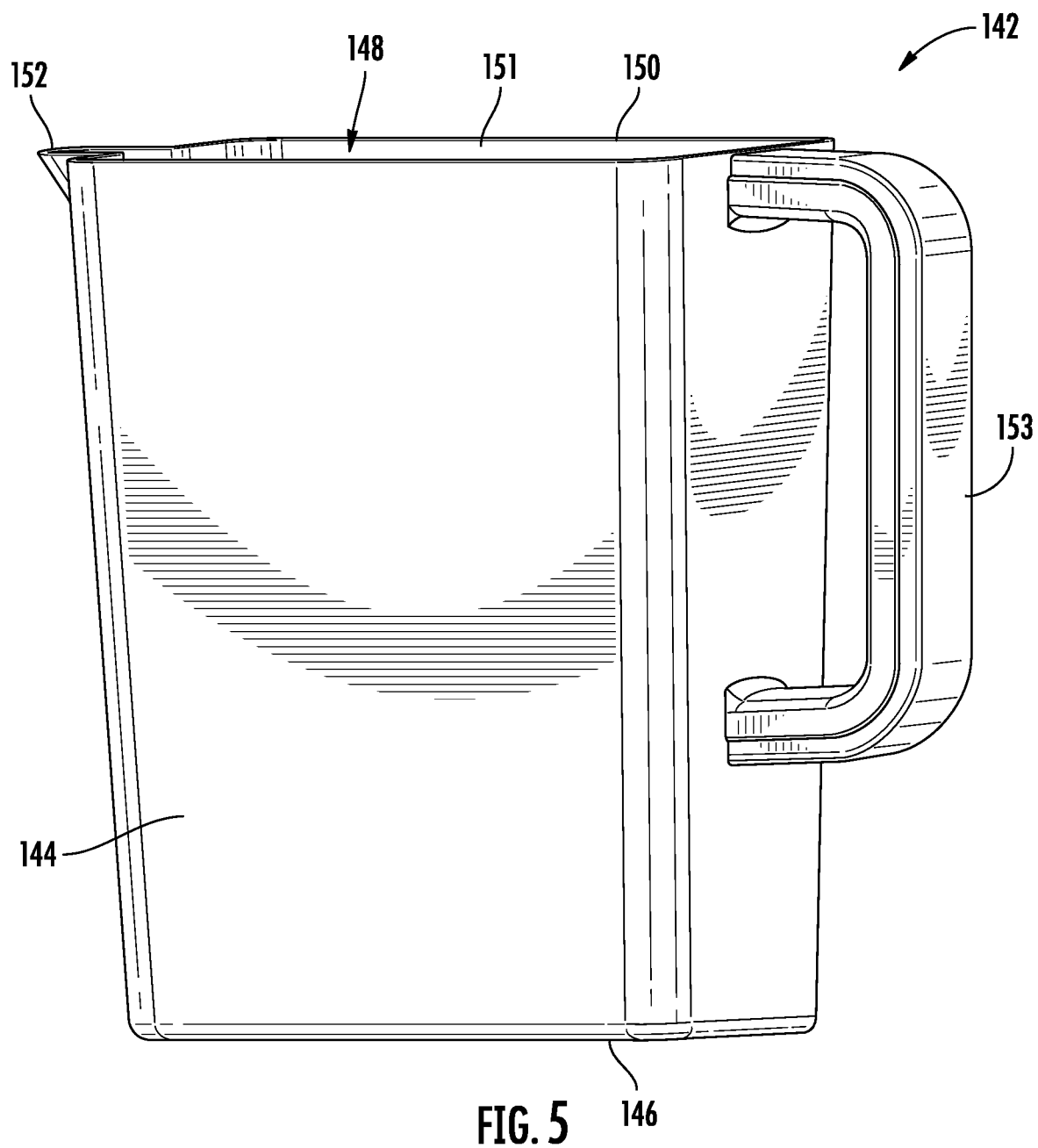
FIG. 5 provides a perspective view of a pitcher in accordance with one or more exemplary embodiments of the present disclosure.
Figure 6:
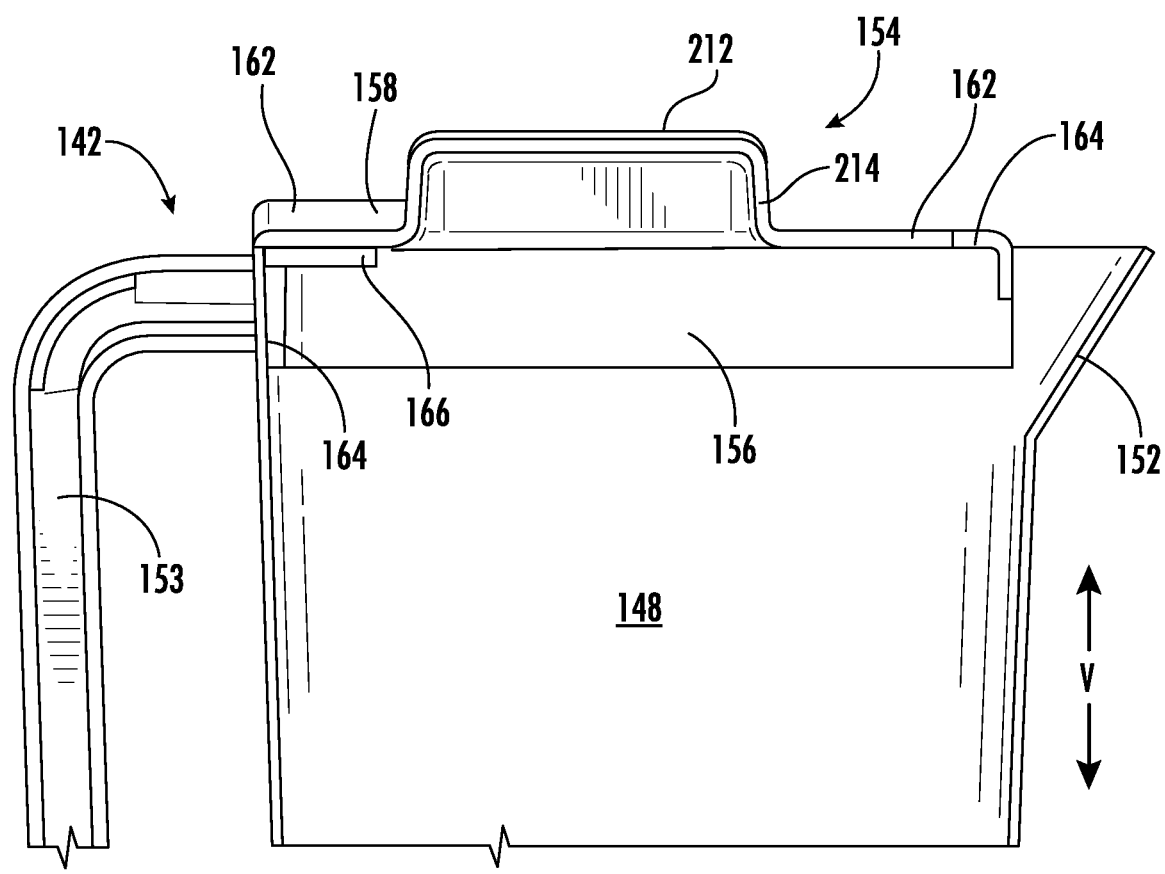
FIG. 6 provides an enlarged side sectional view of a pitcher and lid in accordance with one or more exemplary embodiments of the present disclosure.
Figure 7:
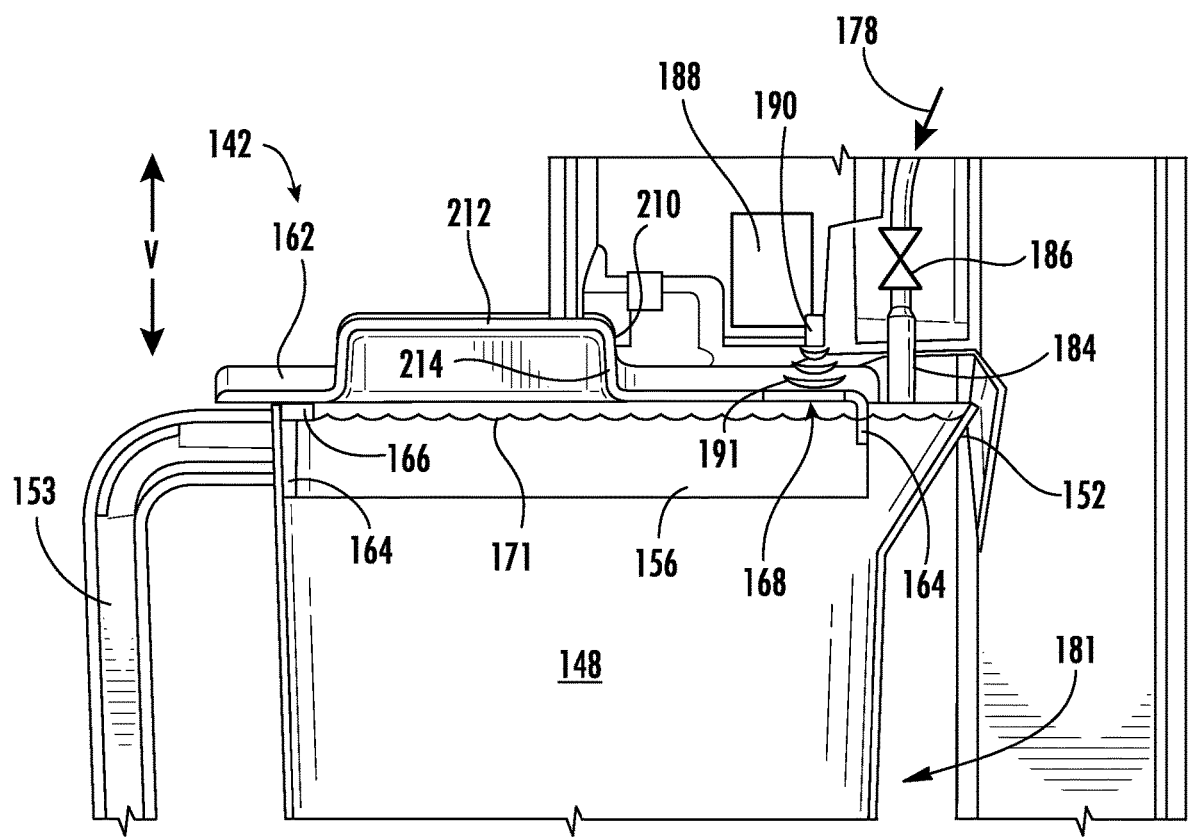
FIG. 7 provides an illustrative view of a pitcher received in a dispenser cavity in accordance with one or more exemplary embodiments of the present disclosure.

Further details of exemplary pitcher 142 may be seen with reference to FIGS. 5, 6, and 7. FIG. 5 is a perspective view of a representative pitcher 142 comprising a pitcher wall 144 connected to, or formed with, pitcher bottom 146. In the illustrated exemplary embodiment, the pitcher wall 144 is a single continuous side wall which extends completely around the outermost perimeter of the pitcher bottom 146 and extends upward from the pitcher bottom 146 generally along the vertical direction V. It should be understood that references herein throughout to the orthogonal direction system including vertical direction V, lateral direction L, and transverse direction T in the context of the pitcher 142 are with reference to when the pitcher 142 is docked in the cavity 181 and, in embodiments where the autofill pitcher system 140 is provided on a door of the refrigerator appliance, the door is in the closed position.

A top edge 150 is formed by the pitcher wall 144 at the pitcher end opposite pitcher bottom 146. The pitcher wall 144 and pitcher bottom 146 define an internal volume of the pitcher 142, i.e., a pitcher volume 148, accessible through opening 151 defined by the top edge 150. In additional embodiments, the pitcher 142 may include a plurality of side walls which collectively extend completely around the outermost perimeter of the pitcher bottom 146 and thereby define the internal volume of the pitcher 142, e.g., pitcher volume 148 may be enclosed on four side (such as front, back, left, and right) by one or more side walls and on a fifth side (e.g., bottom) by the pitcher bottom 146, and the pitcher volume 148 may be open on the sixth side, e.g., at the top.

For convenience, top edge 150 may also define a spout 152 at a first end (e.g., front end) of the pitcher 142 to facilitate directing liquid into, or out of, the pitcher 142. At a second end of the pitcher, opposite the spout 152, a handle 153 may be included to provide a gripping area to aid in manipulating the pitcher 142.

Exemplary pitcher 142 is illustrated as a generally hollow rectangular cuboid for ease of illustration only. Other embodiments may have other shapes, for example a hollow cylinder, or may be non-prismatic, among other possible examples, and may or may not have features such as a spout or a handle.

As illustrated in FIG. 6, embodiments of pitcher 142 may include a lid 154 removably received in, and fitted to, the opening 151 at the top edge 150. The lid 154 may include a peripheral skirt 156 configured to be removably received in the opening 151 of pitcher 142. Some embodiments of the skirt 156 may include features (not shown) that engage an inner portion of pitcher wall 144 at the top edge 150 to secure the lid against accidental separation from the pitcher 142.

Lid 154 may include a top wall 158 joined to, or formed with, the skirt 156. As illustrated in FIG. 6, in some embodiments of the present disclosure, at least a portion of the top wall 158 may be movable, e.g., slidable, relative to the pitcher 142 and the remainder of the lid 154. For example, the lid 154 may include a retractable portion 162. For example, the lid 154 may include the retractable portion 162 and a stationary portion 164, where the retractable portion 162 may be movable relative to the pitcher 142 and the remainder of the lid 154 (i.e., the stationary portion 164 of the lid 154) when the lid 154 is received in the pitcher 142. For example, the retractable portion 162 may be a portion of the top wall 158 of the lid 154, and may be configured to provide an aperture 168 (FIG. 7) when the retractable portion 162 is in the retracted position. In such embodiments, the retractable portion 162 may be movable along a direction generally perpendicular to the vertical direction V between a retracted, open position (FIG. 7) and an extended, closed position (FIG. 6). Also as may be seen in FIGS. 6 and 7, a biasing element 166 may be coupled between the retractable portion 162 and the stationary portion 164. The biasing element 166 may be a spring, such as a coil spring or other linear spring which is configured to provide a biasing force along a linear direction. The biasing element 166 may be configured to urge the retractable portion 162 to or towards the extended position. For example, as may be seen in FIGS. 6 and 7, the biasing element 166 may be uncompressed or relaxed when the retractable portion 162 is in the extended (closed) position (FIG. 6) and the biasing element 166 may be compressed when the retractable portion 162 is in the retracted (open) position (FIG. 7), e.g., the biasing element 166 may be compressed in the retracted position, thereby storing energy in the biasing element 166 to urge the retractable portion 162 back to the extended position when the pitcher 142 is removed from the cavity 181.

As illustrated for example in FIG. 7, dispenser 180 defines a cavity 181 to receive the pitcher 142. In the illustrative embodiment shown in the figures, the dispenser 180 is positioned on the inner surface 134 of left door 126 of the refrigerator appliance 100. Other embodiments may have the dispenser on other doors or elsewhere in the fresh food chamber 122. As illustrated, the cavity 181 comprises a support or shelf 108 (FIGS. 3 and 4) to support the pitcher 142 in the vertical direction V and a sensor board 188 adjacent to the lid 154 of the pitcher 142. As illustrated, the shelf 108 is dedicated to support the pitcher 142 on the left door 126. In other embodiments, the shelf 108 may not be a dedicated shelf for the pitcher 142. The shelf 108 may have other or additional uses, for example storage of other food products on the door. In other embodiments, the shelf 108 may be within the cabinet 120. Other features (not shown) may be provided to secure the pitcher 142 in the cavity 181 during filling and as the door 126 is opened and closed to provide access to the fresh food chamber 122.

The dispenser 180 may include a fill tube 184 adapted to direct water from a water supply 178 to the pitcher 142. The water supply 178 may be, for example, a water utility supply or a private source water supply, such as a private well. A valve 186 may be provided in line with the fill tube 184 between the water supply 178 and the pitcher 142 to selectively allow the flow of water to the pitcher 142. The valve is operatively coupled to the controller 200.

Controller 200 controls the operation of the autofill pitcher system in that it interprets signals received from various sensors of the dispenser 180 and determines if the autofill operation should initiate and when it should stop. Controller 200 may include control circuits, a memory, clock(s), an input/output device such as user interface 118 (FIG. 1), and a microprocessor, such as a general purpose or special purpose microprocessor operable to execute programming instructions or micro-control code associated with the operation of the autofill pitcher system 140 and/or other components of the refrigerator appliance 100. Alternatively, controller 200 may be constructed without using a microprocessor, e.g., using a combination of discrete analog or digital logic circuitry to perform control functionality instead of relying on software.

In embodiments, the controller 200 is in operative communication with a sensor 190 (described below), and the valve 186. The controller may also be in operative communication with auditory or visual signaling devices provided in or on the refrigerator cabinet 120, left and right doors 126, 128, first and second freezer drawers 130, 131, or user interface 118.

In the exemplary embodiment illustrated in FIG. 7, the fill tube 184 is positioned directly above the spout 152 of the pitcher 142. In other embodiments, the fill tube 184 may be in other locations suitable to allow the flow of fluid (e.g., water) into the pitcher volume 148. Fluid flow to the pitcher continues until a stop flow event occurs and the controller 200 receives a signal contraindicating the flow of liquid into the pitcher 142. A stop flow event may occur when the sensor 190 detects a fill level at a predetermined limit. In response to a signal to the controller 200 from the fill sensor 190, controller 200 may then signal the valve 186 to its normally closed position, stopping the flow of water to the pitcher 142. A stop flow event may occur when the liquid level 171 rises to a predetermined vertical level, indicating a predetermined volume of liquid is present in the pitcher volume 148.

In some embodiments, the sensor 190 may be positioned on the sensor board 188 and may be located above the pitcher 142 when the pitcher 142 is docked in the cavity 181. Thus, for example, the sensor 190 may be oriented downwards towards the cavity 181 and, when the pitcher 142 is docked, the pitcher 142 therein. In various embodiments, the sensor 190 may be a non-contact sensor, such as a time-of-flight sensor or an ultrasonic sensor. Thus, for example, the sensor 190 may be configured to emit a wave 191, e.g., a light wave or a sound wave, into the pitcher 142 to or towards the internal volume 148 and water which may be present therein. As those of ordinary skill in the art will recognize, the wave 191 may reflect off of the upper surface of the water (and/or other liquid) within the internal volume 148, and, given the known speed of the wave 191, e.g., the speed of sound, the distance from the sensor 190 to the liquid level 171 may be determined by the time elapsed between the wave 191 being emitted by the sensor 190 and the reflection being received by the sensor 190.

Still referring to FIG. 7, the sensor 190 may be positioned and oriented to emit the wave 191 directly into the internal volume 148 of the pitcher 142 without any obstructions or intervening elements, such as through an opening or aperture 168 in the lid 154. For example, the aperture 168 may be formed between the retractable portion 162 and the stationary portion 164 when the retractable portion 162 is in the retracted, open position. In such embodiments, the autofill pitcher system 140 may include a ledge 210 in the cavity 181. The ledge 210 may be configured to engage the lid 154 when the pitcher 142 is received in the cavity 181, whereby the ledge 210 urges the retractable portion 162 of the lid 154 to the retracted position when the pitcher 142 is received in the cavity 181. For example, the lid 154 may include a tab 212 formed on the lid 154, such as a raised portion of the top wall 158 of the lid 154. As illustrated, the tab 212 may be formed on the retractable portion 162 of the top wall 158 of the lid 154. In such embodiments, the ledge 210 in the cavity 181 may be configured to engage the tab 212 on the lid 154, such as a front wall 214 of the tab 212. For example, the front wall 214 of the tab 212 may extend generally along the vertical direction V at a frontmost portion of the tab 212 (e.g., closest to the spout 152 of the pitcher 142) and the ledge 210 may be generally parallel to the front wall 214 of the tab 212, whereby the ledge 210 engages, e.g., pushes on, the front wall 214 of the tab 212 to urge the tab 212 (along with the remainder of the retractable portion 162) backwards from the extended position as the pitcher 142 is placed in the cavity 181, thereby separating the retractable portion 162 from the stationary portion 164 of the lid 154 to form the aperture 168. Thus, the retractable portion 162 and the aperture 168 provide unobstructed access for the sensor 190 to detect the fill level, e.g., fill level 171, within the internal volume 148 of the pitcher 142 when the pitcher 142 is received in the cavity 181, e.g., the sensor 190 may be positioned above the cavity 181 and may be operable to detect the fill level 171 within the internal volume 148 of the pitcher 142, such as the sensor 190 may be positioned to measure the fill level 171 through the aperture 168 in the lid 154, e.g., by emitting one or more wave(s) 191 through the aperture 168 into the internal volume 148 of the pitcher 142 and receiving one or more corresponding reflections from the internal volume 148 through the aperture 168.

Figure 8:
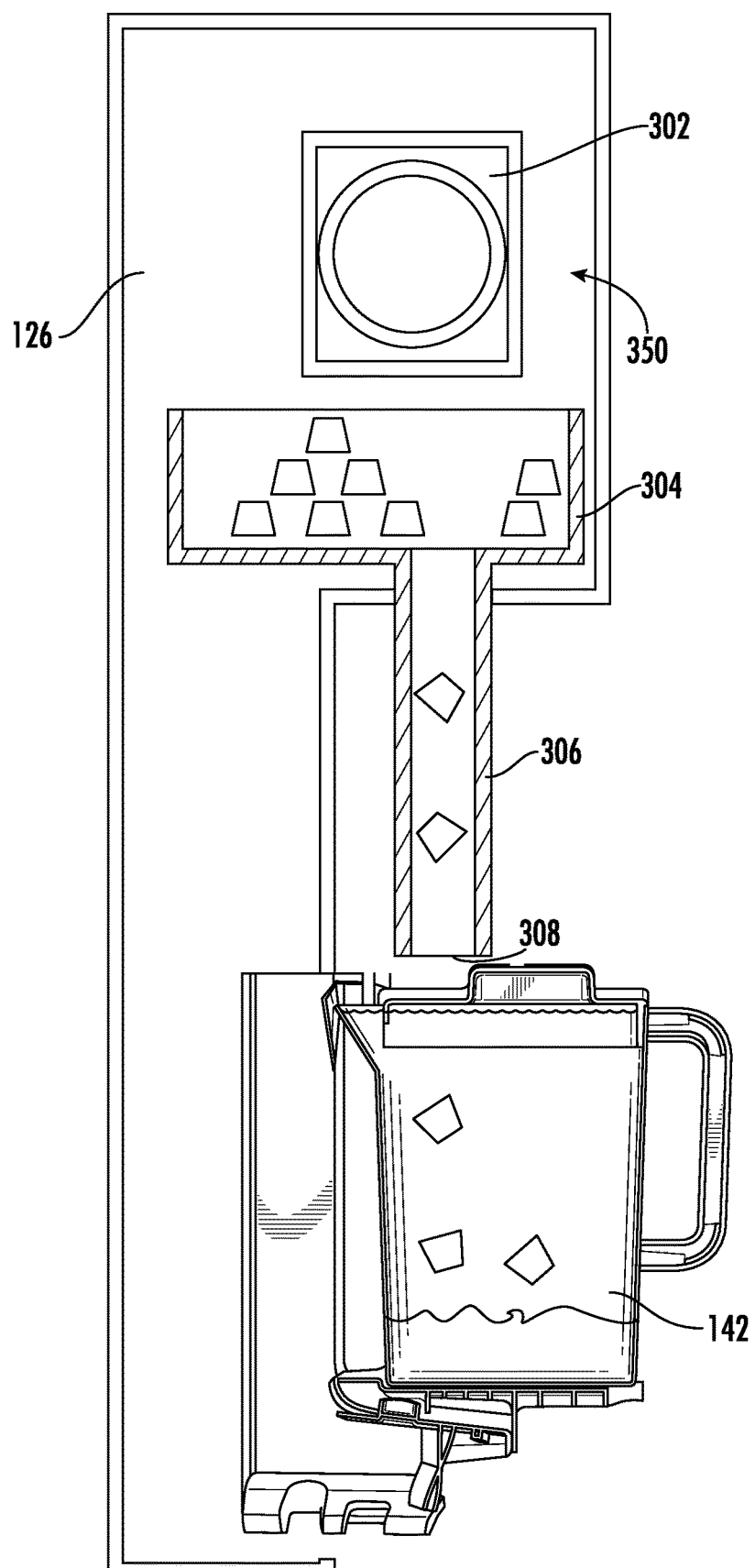
FIG. 8 provides a side sectional view of an autofill pitcher system in accordance with one or more exemplary embodiments of the present disclosure.

In some embodiments, e.g., as illustrated in FIG. 8, the refrigerator appliance 100 may include an ice maker 302, e.g., positioned in an ice box 350, such as a subcompartment formed on an internal side of one of the refrigerator doors, e.g., left door 126. An ice storage bin 304 may be positioned below the ice maker 302 (e.g., within the ice box 350) to receive and hold ice pieces formed in the ice maker 302, such as the ice pieces may drop into the ice storage bin 304 by gravity when harvested from the ice maker 302. The ice box 350 may be colder than the fresh food chamber, such as the ice box 350 may receive a flow of air from an evaporator of the refrigerator appliance and/or from a freezer chamber of the refrigerator appliance to cool the interior of the ice box to a temperature suitable for forming and/or storing ice therein, such as to a temperature at or below the freezing point of water. An ice source or ice supply may thus be provided, e.g., ice pieces produced by the ice maker 302 may be retained in the ice storage bin 304 and may be provided from the ice storage bin 304 to the autofill pitcher system 140 and/or to a dispenser assembly of the refrigerator appliance.

In such embodiments, the refrigerator appliance 100, e.g., the dispenser of the autofill pitcher system 140 thereof, may also include a chute 306. The chute 306 may extend from the ice supply, e.g., the ice storage bin 304, to the cavity of the autofill pitcher system 140. For example, an outlet 308 of the chute 306 may be positioned above the pitcher 142, e.g., above the aperture in the lid of the pitcher 142, when the pitcher 142 is docked in the cavity, and the outlet 308 may be oriented generally downward along the vertical direction V to direct ice pieces from the ice supply to the internal volume of the pitcher 142 when the pitcher 142 is received within the cavity.

Figure 9:
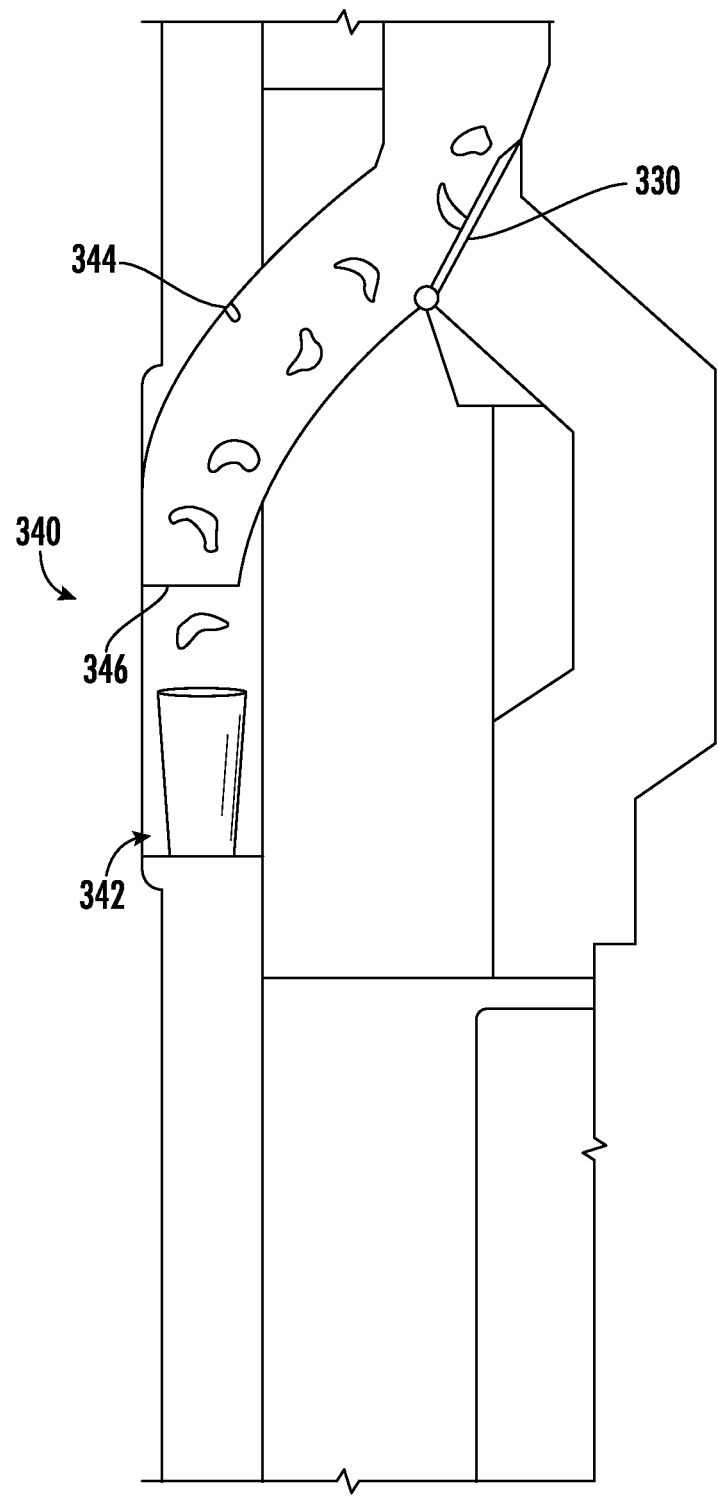
FIG. 9 provides a sectional view of a portion of a door of a refrigerator appliance in accordance with one or more exemplary embodiments of the present disclosure.
Figure 10:
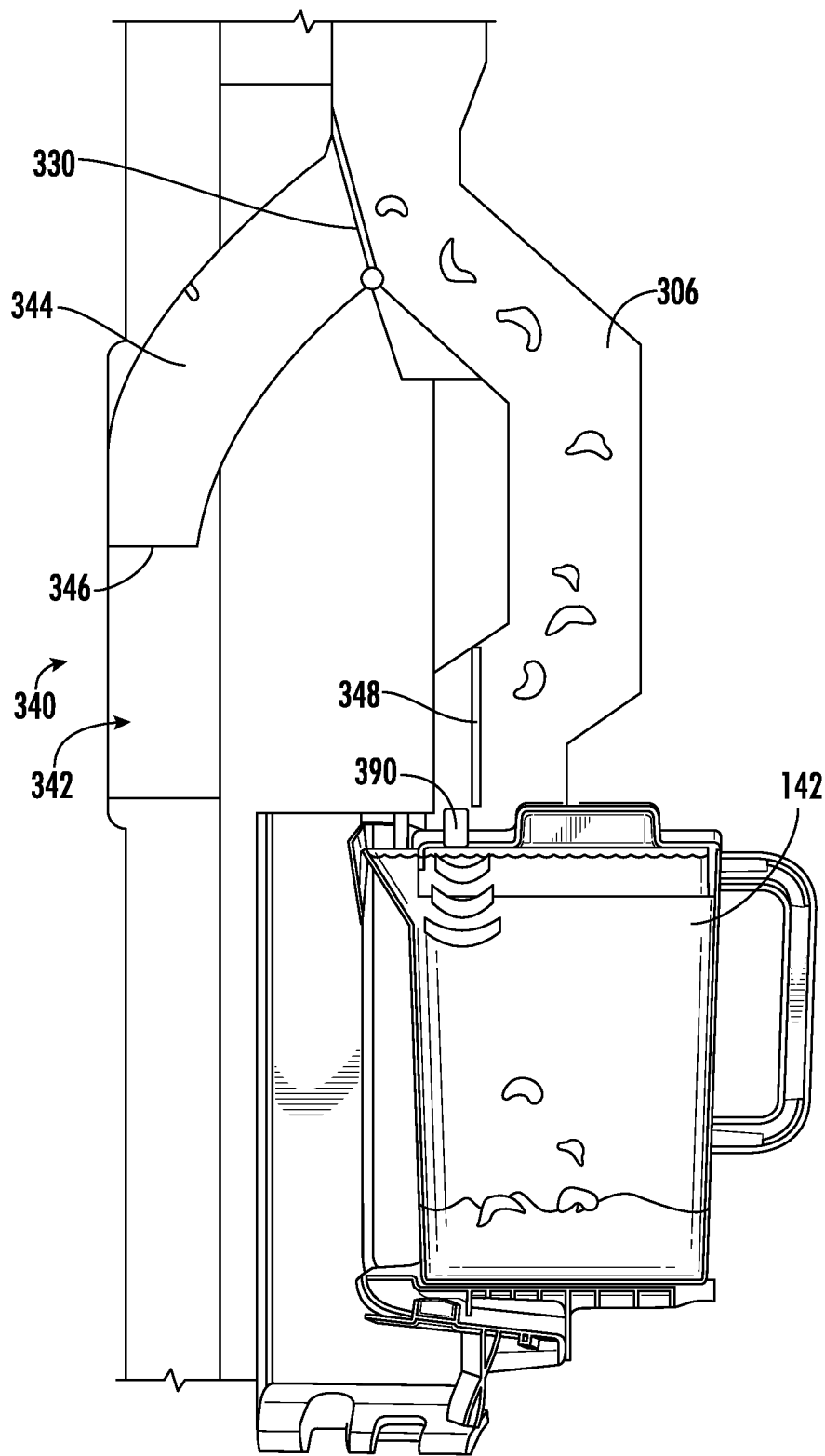
FIG. 10 provides an additional view of another portion of the door of FIG. 9.

Referring now generally to FIGS. 9 and 10, the refrigerator appliance 100 may include a dispensing assembly 340 in one or more exemplary embodiments of the present subject matter. Dispensing assembly 340 is generally configured for dispensing liquid water and/or ice. Although an exemplary dispensing assembly 340 is illustrated and described herein, it should be appreciated that variations and modifications may be made to dispensing assembly 340 while remaining within the present subject matter.

Dispensing assembly 340 and its various components may be positioned at least in part within a dispenser recess 342 defined on one of refrigerator doors 126 or 128, such as on an external side of the door, such as on an external side of the left door 126 while the autofill pitcher system 140 is positioned on an internal side of the same door, e.g., left door 126, where the internal side is opposite the external side. In this regard, dispenser recess 342 may be defined on a front side of the refrigerator appliance 100 such that a user may operate dispensing assembly 340 without opening refrigerator door(s) 126 and/or 128. In addition, dispenser recess 342 is positioned at a predetermined elevation convenient for a user to access ice and enabling the user to access ice without the need to bend over. In the exemplary embodiment, dispenser recess 342 is positioned at a level that approximates the chest level of a user.

Dispensing assembly 340 may includes an ice dispenser 344 including a discharging outlet 346 for discharging ice from dispensing assembly 340. An actuating mechanism, e.g., a paddle (not shown), may be mounted below discharging outlet 346 for operating ice dispenser 344. In alternative exemplary embodiments, any suitable actuating mechanism may be used to operate ice dispenser 344. For example, ice dispenser 344 may include a sensor (such as an ultrasonic sensor) or a button rather than a paddle. Discharging outlet 346 and the actuating mechanism may be external parts of ice dispenser 344 and may be mounted in dispenser recess 342.

In such embodiments, the ice dispenser 344 may also be connected to the ice supply, e.g., ice storage bin 304 (FIG. 8), such as both the ice dispenser 344 and the chute 306 may be connected to the ice storage bin 304. Thus, for example, the refrigerator appliance may be configured for selectively directing ice from the ice supply to one of the pitcher 142 or the dispenser recess 342. For example, a damper 330 may be positioned between the ice storage bin 304 on one side and the pitcher 142 and the dispenser recess 342 on the other side of the damper 330 (e.g., vertically, such as the damper 330 may be below the ice storage bin 304 and above the pitcher 142 and the dispenser recess 342). The damper 330 may be movable, e.g., rotatable, between a first position and a second position, where the ice pieces from the ice storage bin 304 may be directed to the dispenser recess 342 when the damper 330 is in the first position (e.g., FIG. 9) and the ice pieces from the ice storage bin 304 may be directed to the pitcher 142 when the damper 330 is in the second position (e.g., FIG. 10). In some embodiments, e.g., as illustrated in FIG. 10, a shield 348 may be provided in the chute 306 to protect the sensor 190 from falling ice pieces. For example, the shield 348 may extend over the sensor 190 and between the sensor 190 and the path of ice pieces falling through and out of the chute 306.

Figure 11:
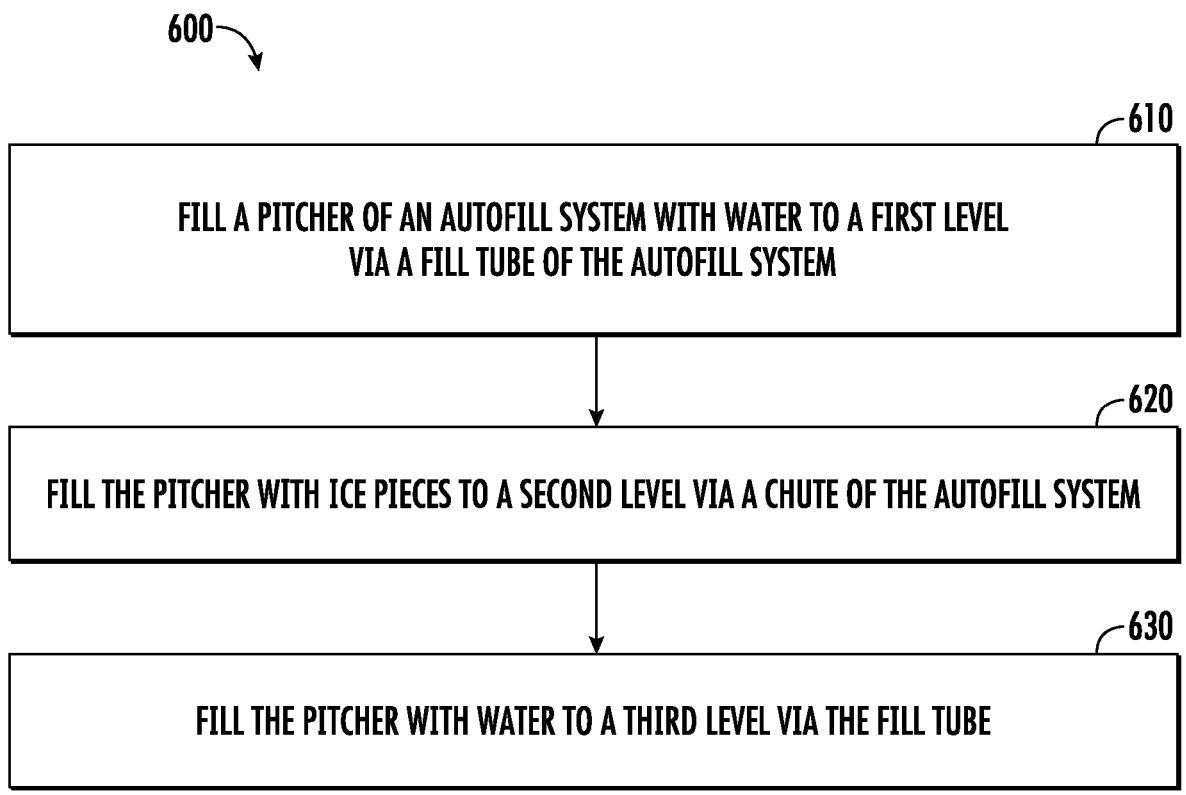
FIG. 11 provides a flowchart illustrating an exemplary method of operating a refrigerator appliance according to one or more additional exemplary embodiments of the present disclosure.

Turning now to FIG. 11, embodiments of the present disclosure may also include methods of operating a refrigerator appliance, such as the exemplary method 600 illustrated in FIG. 11. Such methods may be used with any suitable refrigerator appliance, for example but not limited to the exemplary refrigerator appliance 100 described above. Thus, the refrigerator appliance operated according to method 600 may include a cabinet defining a fresh food chamber and an autofill pitcher system. The autofill pitcher system may include a pitcher and a dispenser defining a cavity. The pitcher may include at least one pitcher wall and an internal volume defined within the at least one pitcher wall. The cavity may be configured to receive the pitcher. The dispenser may include a fill tube and a chute. The fill tube may be positioned and configured to direct a flow of water from a water supply into the internal volume of the pitcher when the pitcher is received within the cavity. The chute may be positioned and configured to direct one or more ice pieces from an ice supply into the internal volume of the pitcher when the pitcher is received within the cavity.

As illustrated in FIG. 11, method 600 may include (610) filling the pitcher, e.g., pitcher 142, with water to a first level via the fill tube. It is to be understood that references herein throughout to "water" are used with reference to liquid water, whereas ice or ice pieces refers to water in solid form. In some embodiments, the first level may be detected or measured with a sensor, such as the exemplary sensor 190 described above. Method 600 may further include (620) filling the pitcher with ice pieces to a second level via the chute after filling the pitcher with water to the first level and/or when the volume of water in the pitcher is at the first level or approximately at the first level (e.g., within plus or minus ten percent of the first level). Thus, for example, the first level of water may be high enough to cushion the ice's fall, e.g., to prevent or reduce impacts on the floor of the pitcher, e.g., as compared to dispensing ice pieces into an empty pitcher, as well as reducing the noise generated when the ice pieces land in the water versus landing directly on the floor of the pitcher. The first level may also, at the same time, be low enough to prevent or minimize spilling and/or splashing of liquid water out of the pitcher when the ice pieces fall into the water. For example, the first level may be between about ten percent (10%) fill and about sixty percent (60%) fill, such as between about twenty percent (20%) fill and about fifty percent (50%) fill, such as between about thirty percent (30%) fill and about forty percent (40%) fill.

In some embodiments, the pitcher, e.g., pitcher 142, may be filled with water above the first level (e.g., in such embodiments, (610) filling the pitcher with water to the first level may also include filling the pitcher with water beyond, e.g., above, the first level) and the ice may then be provided once the water has been dispensed such that the water level drops down to the first level. Thus, for example, the first level may be a low level and the ice may be provided to the pitcher before refilling the pitcher with water back to a full level.

As may be seen, e.g., in FIG. 11, method 600 may further include (630) filling the pitcher with water to a third level via the fill tube after filling the pitcher with ice pieces to the second level. In some embodiments, the second level may be about ten to about thirty percentage points above the first level. For example, where the first level is 50% fill, the second level may be between about 60% fill and about 70% fill. As another example, where the first level is 30% fill, the second level may be between about 40% fill and about 60% fill. The third level generally corresponds to about one hundred percent (100%) fill, e.g., filling the internal volume of the pitcher to the maximum capacity. Thus, filling the pitcher with water to the third level may include completely filling the pitcher, e.g., any remaining amount of the internal volume after the second level, with the second low of water. In additional embodiments, the third level may correspond to the pitcher being between about ninety percent (90%) full and one hundred percent (100%) full.

In some embodiments, one or more of the above-described levels may be user-selectable. For example, the user may select or input (e.g., via user interface 118) a desired amount or proportion of ice for the fill, and the first and second levels may be automatically selected based on and in response to the user-selected ice level. For example, when the user-selected ice level is lower, the first level may be higher, while the first level may be reduced (but not below a minimum amount such that at least some liquid water is present in the pitcher before the ice is added) to accommodate more ice when the user-selected ice level is higher. In one example, the user-selected ice level may comprise a selectable range between twenty percent and fifty percent fill, e.g., between about 20% of the internal volume and about 50% of the internal volume may be filled with ice. Thus, if the user-selected ice level is lower, e.g., 30% fill, then the first level may be about 40% fill, such that the second level would be about 70% fill, and the water fill provided at (630) would include adding about 30% of the internal volume in water to bring the pitcher to a full or approximately full state. In another example, if the user-selected ice level is fifty percent (50%) fill, then the first level may be about twenty percent (20%) or about twenty-five percent (25%) fill. Accordingly, the user may input only one selection, and the first level, second level, and third levels may be determined by the controller of the refrigerator appliance in order to provide the selected amount or proportion of ice. In additional embodiments, each of the three levels may be directly selected or input by the user, e.g., via the user interface.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A refrigerator appliance comprising:
   a cabinet defining a fresh food chamber;
   an autofill pitcher system, the autofill pitcher system comprising:
      a pitcher comprising at least one pitcher wall and an internal volume defined within the at least one pitcher wall; and
      a dispenser defining a cavity, the cavity configured to receive the pitcher, the dispenser comprising a fill tube and a chute, the fill tube positioned and configured to direct a flow of water from a water supply into the internal volume of the pitcher when the pitcher is received within the cavity, the chute positioned and configured to direct one or more ice pieces from an ice supply into the internal volume of the pitcher when the pitcher is received within the cavity;
   a door with a dispenser recess formed in an external side of the door, wherein the cavity of the dispenser is positioned on an internal side of the door opposite the dispenser recess; and
   a controller, the controller configured for:
      selectively directing ice from the ice supply to one of the pitcher or the dispenser recess;
      filling the pitcher with water via the fill tube;
      filling the pitcher with ice pieces via the chute; and
      stopping fill when a level of water and ice within the internal volume of the pitcher reaches a preset level.

2. The refrigerator appliance of claim 1, further comprising a sensor operable to detect the level of water and ice within the internal volume of the pitcher.

3. The refrigerator appliance of claim 2, wherein filling the pitcher with water via the fill tube comprises filling the pitcher with water to a first level, wherein filling the pitcher with ice pieces via the chute comprises filling the pitcher with ice pieces to a second level after filling the pitcher with water to the first level, the controller further configured for filling the pitcher with water to a third level via the fill tube after filling the pitcher with ice pieces to the second level, wherein the preset level is the third level.

4. The refrigerator appliance of claim 3, wherein the controller is in signal communication with the sensor, wherein filling the pitcher with water to the first level via the fill tube comprises opening a valve to permit water to flow to the internal volume via the fill tube, detecting the first level with the sensor, and closing the valve in response to detecting the first level with the sensor, wherein filling the pitcher with ice pieces to the second level via the chute comprises directing ice pieces to the internal volume of the pitcher until the sensor detects the second level, and wherein filling the pitcher with water to the third level via the fill tube comprises opening the valve to permit water to flow to the internal volume via the fill tube, detecting the third level with the sensor, and closing the valve in response to detecting the third level with the sensor.

5. The refrigerator appliance of claim 3, further comprising a user interface, the controller in signal communication with the user interface, wherein the controller is further configured for receiving a user input via the user interface and defining values for each of the first level, the second level, and the third level based on the user input.

6. The refrigerator appliance of claim 2, wherein the autofill pitcher system further comprises a lid, the lid removably coupled to the pitcher above the internal volume of the pitcher, wherein the sensor is operable to detect the level of water and ice within the internal volume of the pitcher when the lid is coupled to the pitcher and the pitcher is received in the cavity below the sensor.

7. The refrigerator appliance of claim 6, wherein the lid comprises a retractable portion, the retractable portion movable along a direction generally perpendicular to a vertical direction between a retracted position and an extended position, wherein, when the retractable portion is in the retracted position, an aperture is formed in the lid, the sensor positioned to measure the level of water and ice through the aperture in the lid.

8. The refrigerator appliance of claim 1, wherein the autofill pitcher system further comprises a lid, the lid removably coupled to the pitcher above the internal volume of the pitcher, wherein the lid comprises a retractable portion, the retractable portion movable along a direction generally perpendicular to a vertical direction between a retracted position and an extended position, and wherein the chute is positioned and configured to direct one or more ice pieces from the ice supply into the internal volume of the pitcher when the pitcher is received within the cavity and the retractable portion of the lid is in the retracted position.

9. A method of operating a refrigerator appliance, the refrigerator appliance comprising a cabinet defining a fresh food chamber, a sensor, and an autofill pitcher system, the autofill pitcher system comprising a pitcher and a dispenser defining a cavity, the pitcher comprising at least one pitcher wall and an internal volume defined within the at least one pitcher wall, the cavity configured to receive the pitcher, the dispenser comprising a fill tube and a chute, the fill tube positioned and configured to direct a flow of water from a water supply into the internal volume of the pitcher when the pitcher is received within the cavity, the chute positioned and configured to direct one or more ice pieces from an ice supply into the internal volume of the pitcher when the pitcher is received within the cavity, the method comprising:
   filling the pitcher with water via the fill tube, wherein filling the pitcher with water via the fill tube comprises filling the pitcher with water to a first level;
   filling the pitcher with ice pieces via the chute, wherein filling the pitcher with ice pieces via the chute comprises filling the pitcher with ice pieces to a second level after filling the pitcher with water to the first level;
   detecting the level of water and ice within the internal volume of the pitcher with the sensor;
   filling the pitcher with water to a third level via the fill tube after filling the pitcher with ice pieces to the second level; and
   stopping fill when a level of water and ice within the internal volume of the pitcher reaches a preset level, wherein the preset level is the third level.

10. The method of claim 9, wherein filling the pitcher with water to the first level via the fill tube comprises opening a valve to permit water to flow to the internal volume via the fill tube, detecting the first level with the sensor, and closing the valve in response to detecting the first level with the sensor, wherein filling the pitcher with ice pieces to the second level via the chute comprises directing ice pieces to the internal volume of the pitcher until the sensor detects the second level, and wherein filling the pitcher with water to the third level via the fill tube comprises opening the valve to permit water to flow to the internal volume via the fill tube, detecting the third level with the sensor, and closing the valve in response to detecting the third level with the sensor.

11. The method of claim 9, wherein the refrigerator appliance further comprises a user interface, the method further comprising receiving a user input via the user interface and defining values for each of the first level, the second level, and the third level based on the user input.

12. The method of claim 9, wherein the autofill pitcher system further comprises a lid, the lid removably coupled to the pitcher above the internal volume of the pitcher, wherein the level of water and ice within the internal volume of the pitcher is detected with the sensor when the lid is coupled to the pitcher and the pitcher is received in the cavity below the sensor.

13. The method of claim 12, wherein the lid comprises a retractable portion, the retractable portion movable along a direction generally perpendicular to a vertical direction between a retracted position and an extended position, further comprising moving the lid to the retracted position, whereby an aperture is formed in the lid, wherein detecting the level of water and ice within the internal volume of the pitcher with the sensor comprises measuring the level of water and ice through the aperture in the lid.

14. The method of claim 9, wherein the autofill pitcher system further comprises a lid, the lid removably coupled to the pitcher above the internal volume of the pitcher, wherein the lid comprises a retractable portion, the retractable portion movable along a direction generally perpendicular to a vertical direction between a retracted position and an extended position, further comprising moving the retractable portion of the lid to the retracted position before filling the pitcher with ice pieces.

15. The method of claim 9, wherein the refrigerator appliance further comprises a door with a dispenser recess formed in an external side of the door, wherein the cavity of the dispenser is position on an internal side of the door opposite the dispenser recess.

16. The method of claim 15, further comprising selectively directing ice from the ice supply to one of the pitcher or the dispenser recess.

17. A refrigerator appliance comprising:
a cabinet defining a fresh food chamber;
an autofill pitcher system, the autofill pitcher system comprising:
a pitcher comprising at least one pitcher wall and an internal volume defined within the at least one pitcher wall; and
a dispenser defining a cavity, the cavity configured to receive the pitcher, the dispenser comprising a fill tube and a chute, the fill tube positioned and configured to direct a flow of water from a water supply into the internal volume of the pitcher when the pitcher is received within the cavity, the chute positioned and configured to direct one or more ice pieces from an ice supply into the internal volume of the pitcher when the pitcher is received within the cavity;
a sensor operable to detect a level of water and ice within the internal volume of the pitcher; and
a controller, the controller configured for:
filling the pitcher with water via the fill tube to a first level;
filling the pitcher with ice pieces via the chute to a second level after filling the pitcher with water to the first level;
filling the pitcher with water to a third level via the fill tube after filling the pitcher with ice pieces to the second level; and
stopping fill when the level of water and ice within the internal volume of the pitcher reaches a preset level, wherein the preset level is the third level.

18. The refrigerator appliance of claim 17, wherein the controller is in signal communication with the sensor, wherein filling the pitcher with water to the first level via the fill tube comprises opening a valve to permit water to flow to the internal volume via the fill tube, detecting the first level with the sensor, and closing the valve in response to detecting the first level with the sensor, wherein filling the pitcher with ice pieces to the second level via the chute comprises directing ice pieces to the internal volume of the pitcher until the sensor detects the second level, and wherein filling the pitcher with water to the third level via the fill tube comprises opening the valve to permit water to flow to the internal volume via the fill tube, detecting the third level with the sensor, and closing the valve in response to detecting the third level with the sensor.

19. The refrigerator appliance of claim 17, further comprising a user interface, the controller in signal communication with the user interface, wherein the controller is further configured for receiving a user input via the user interface and defining values for each of the first level, the second level, and the third level based on the user input.

20. The refrigerator appliance of claim 17, wherein the autofill pitcher system further comprises a lid, the lid removably coupled to the pitcher above the internal volume of the pitcher, wherein the sensor is operable to detect the level of water and ice within the internal volume of the pitcher when the lid is coupled to the pitcher and the pitcher is received in the cavity below the sensor.

* * * * *